(12) United States Patent
Asai (10) Patent No.: US 10,870,354 B2
(45) Date of Patent: Dec. 22, 2020

(54) VEHICLE-MOUNTING STRUCTURE FOR CONTACTLESS POWER RECEPTION DEVICE

(71) Applicant: NISSAN MOTOR CO., LTD., Yokohama (JP)

(72) Inventor: Akihiro Asai, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/478,538

(22) PCT Filed: Jan. 30, 2017

(86) PCT No.: PCT/JP2017/003149
§ 371 (c)(1),
(2) Date: Jul. 17, 2019

(87) PCT Pub. No.: WO2018/138908
PCT Pub. Date: Aug. 2, 2018

(65) Prior Publication Data
US 2020/0047633 A1   Feb. 13, 2020

(51) Int. Cl.
| | |
|---|---|
| B60L 5/00 | (2006.01) |
| H02J 50/12 | (2016.01) |
| B60L 53/122 | (2019.01) |
| H01F 38/14 | (2006.01) |
| B60L 50/60 | (2019.01) |
| B60L 53/12 | (2019.01) |
| B60L 53/20 | (2019.01) |

(52) U.S. Cl.
CPC ............. *B60L 5/00* (2013.01); *B60L 50/60* (2019.02); *B60L 53/12* (2019.02); *B60L 53/122* (2019.02); *H01F 38/14* (2013.01); *H02J 50/12* (2016.02); *B60L 50/66* (2019.02); *B60L 53/20* (2019.02)

(58) Field of Classification Search
None
See application file for complete search history.

(56) References Cited

U.S. PATENT DOCUMENTS

| | | | |
|---|---|---|---|
| 9,676,285 B2 | 6/2017 | Niederhauser et al. | |
| 9,711,995 B2 | 7/2017 | Yuasa | |
| 10,144,300 B2* | 12/2018 | Asai | ........................ B60L 53/36 |
| 2011/0300427 A1 | 12/2011 | Iwasa et al. | |

(Continued)

FOREIGN PATENT DOCUMENTS

| | | |
|---|---|---|
| CN | 105121229 A | 12/2015 |
| CN | 105164771 A | 12/2015 |

(Continued)

*Primary Examiner* — Jared Fureman
*Assistant Examiner* — Joel Barnett
(74) *Attorney, Agent, or Firm* — Foley & Lardner LLP (57) ABSTRACT

A power reception coil is a circular coil having a hollow portion formed in a center portion of the power reception coil in a radial direction. The power reception coil, a resonant capacitor, and a magnetic member are arranged in a power reception coil unit forming a contactless power reception device. The power reception coil unit is attached to a member element serving as a frame member of a vehicle body. A hollow portion corresponding region which is a portion of the power reception coil unit corresponding to the hollow portion of the power reception coil is in contact with the member element.

5 Claims, 11 Drawing Sheets

(56) References Cited

U.S. PATENT DOCUMENTS

| | | | |
|---|---|---|---|
| 2014/0320078 A1* | 10/2014 | Nakamura | B60L 50/64 320/108 |
| 2014/0327391 A1 | 11/2014 | Niederhauser et al. | |
| 2015/0364924 A1 | 12/2015 | Yuasa | |
| 2016/0082847 A1 | 3/2016 | Asai | |
| 2016/0250935 A1* | 9/2016 | Yuasa | B60L 53/12 307/10.1 |

FOREIGN PATENT DOCUMENTS

| | | |
|---|---|---|
| CN | 105226841 A | 1/2016 |
| EP | 2 960 910 A1 | 12/2015 |
| EP | 2 985 188 A1 | 2/2016 |
| EP | 3 069 921 A2 | 9/2016 |
| JP | 2013-67381 A | 4/2013 |
| JP | 2014-011939 A | 1/2014 |
| JP | 2016-112899 A | 6/2016 |
| JP | 2016-119757 A | 6/2016 |

* cited by examiner

VEHICLE-MOUNTING STRUCTURE FOR CONTACTLESS POWER RECEPTION DEVICE

TECHNICAL FIELD

The present invention relates to a vehicle-mounting structure for a contactless power reception device.

BACKGROUND ART

A contactless power feeding apparatus including a contactless power transmission device installed on a road surface and a contactless power reception device mounted in a vehicle has been conventionally publicly known (see, for example, Patent Literature 1). The contactless power reception device includes a power reception coil unit.

In Patent Literature 1, the power reception coil unit is attached to both of paired left and right base portions across a tunnel portion formed in a floor panel of the vehicle. Specifically, the tunnel portion and the base portions extend in a vehicle front-rear direction and left and right end portions of the power reception coil unit are fastened to the paired left and right base portions with bolts.

CITATION LIST

Patent Literature

Patent Literature 1: Japanese Patent Application Publication No. 2016-112899

SUMMARY OF INVENTION

However, the power reception coil unit includes a power reception coil and a center portion of the power reception, coil in the radial direction is formed to be a hollow portion. Accordingly, among portions of the power reception coil unit, a portion including the center portion of the power reception coil in the radial direction has lower stiffness than the end portions. Thus, there is a risk that, in the power reception coil unit supported at the left and right end portions, the center portion in the left-right direction vibrates in an up-down direction and generate abnormal noise in traveling of the vehicle.

In view of this, the present invention provides a vehicle-mounting structure for a contactless power reception device which can maintain high holding stiffness in the case where a power reception coil unit is mounted in a vehicle.

In a vehicle-mounting structure for a contactless power reception device according to the present invention, a power reception coil unit is mounted on a member element serving as a frame member of a vehicle body. The power reception coil unit includes a power reception coil. The power reception coil is a circular coil in which a hollow portion is formed in a center portion in a radial direction. A hollow portion corresponding region which is a portion of the power reception coil unit corresponding to the hollow portion of the power reception coil is in contact with the member element.

ADVANTAGEOUS EFFECTS OF INVENTION

In the present invention, the stiffness at which the power reception coil unit is held is improved and vibration and the like of the power reception coil unit in traveling of the vehicle are reduced.

DESCRIPTION OF EMBODIMENTS

Embodiments of the present invention are described below in detail with reference to the drawings.

First Embodiment

Figure 1:
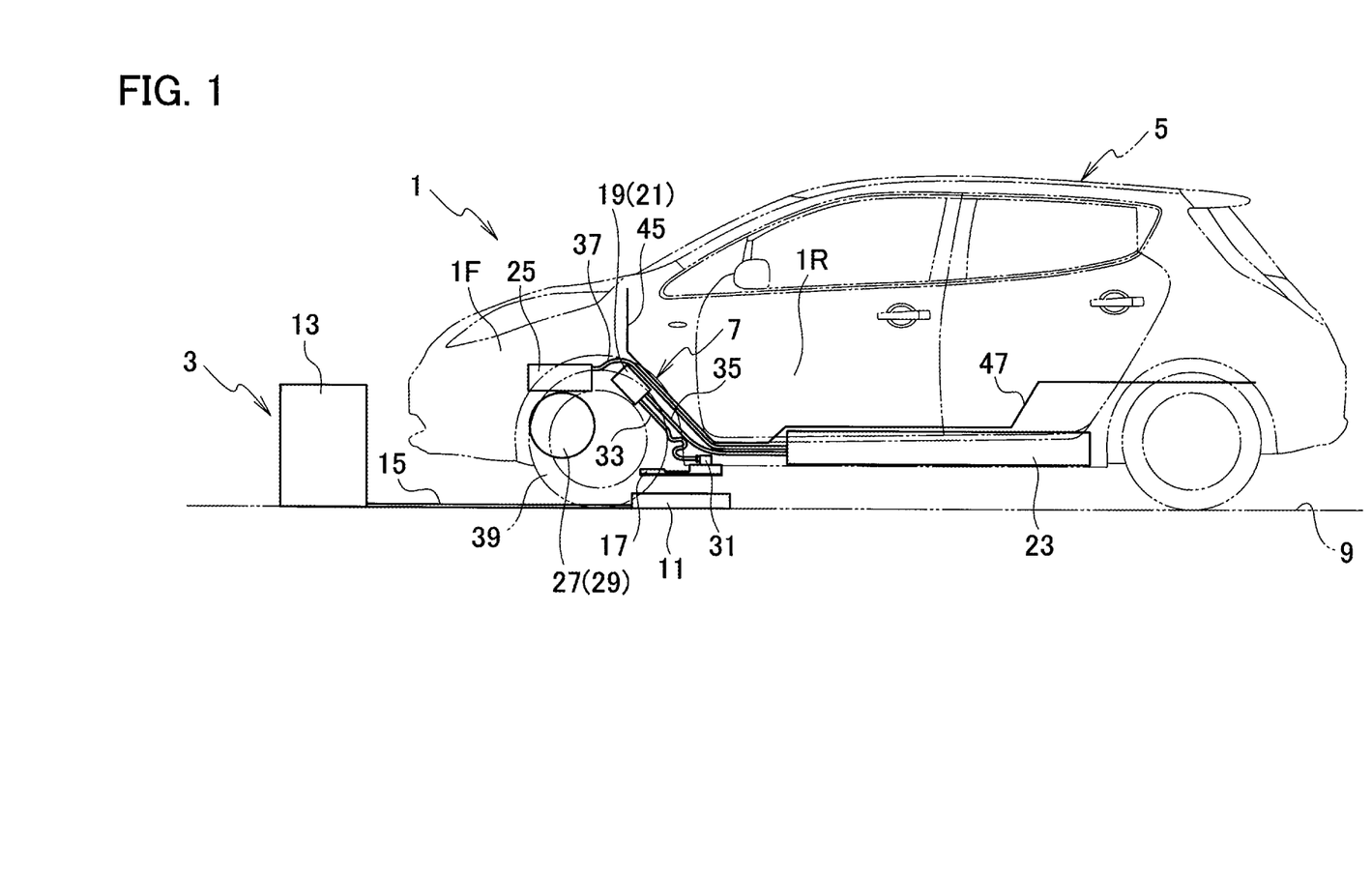
FIG. 1 is a view illustrating an entire contactless power feeding apparatus according to the present invention.

A contactless power feeding apparatus 1 illustrated in FIG. 1 includes a contactless power transmission device 3 installed in a parking space and a contactless power reception device 7 mounted in a vehicle 5. For example, an electric car, a hybrid car, and the like are applicable as the vehicle 5.

The contactless power transmission device 3 includes: a power transmission coil unit 11 installed on a road surface 9 of the parking space and including a power transmission coil; a power supply device 13; and a wire 15 connecting the power transmission coil unit 11 and the power supply device 13 to each other. The power transmission coil is formed mainly of a primary coil made of an electrically-conductive wire.

The contactless power reception device 7 includes a power reception coil unit 17, a rectifier 19, a relay box 21, a battery 23, an inverter 25, a motor 27, and a reducer 29. Note that the power reception coil unit 17 includes a power reception coil 83 and a detailed structure of the power reception coil unit 17 is described later.

The rectifier 19 is connected to a junction box 31 of the power reception coil unit 17 via a first harness 33. The rectifier 19 is formed of a rectifier circuit configured to rectify AC power received by the power reception coil 83 to a direct current. The first harness 33 is loosely routed with an extra length in a normal state (state of no abnormality such as collision).

The relay box 21 includes a relay switch. A main circuit system including the battery 23 can be isolated from the power reception coil and the rectifier 19 which form a charge circuit part by turning off the relay switch.

The battery 23 is formed by connecting multiple secondary cells to one another. The battery 23 is a power source of the vehicle 5. The battery 23 and the relay box 21 are connected to each other via a second harness 35. The second harness 35 is loosely routed with an extra length in a normal state (state of no abnormality such as collision).

The inverter 25 is a control circuit such as a PWM control circuit including a switching element such as an IGBT. The inverter 25 converts DC power outputted from the battery 23 to AC power based on a switching control signal and supplies the AC power to the motor 27. The inverter 25 and the battery 23 are connected to each other via a third harness 37. The third harness 37 is loosely routed with an extra length in a normal state (state of no abnormality such as collision).

The motor 27 is formed of, for example, a three-phase AC electric motor. The motor 27 serves as a drive source for driving the vehicle 5. The reducer 29 adjusts the revolution speed of the motor 27 to an appropriate value. Note that, in the vehicle 5 of FIG. 1, a front portion of the power reception coil unit 17 is arranged to overlap a front wheel 39 in a side view and the power reception coil unit 17 is arranged inside the front wheel 39 in a vehicle width direction.

Figure 2:
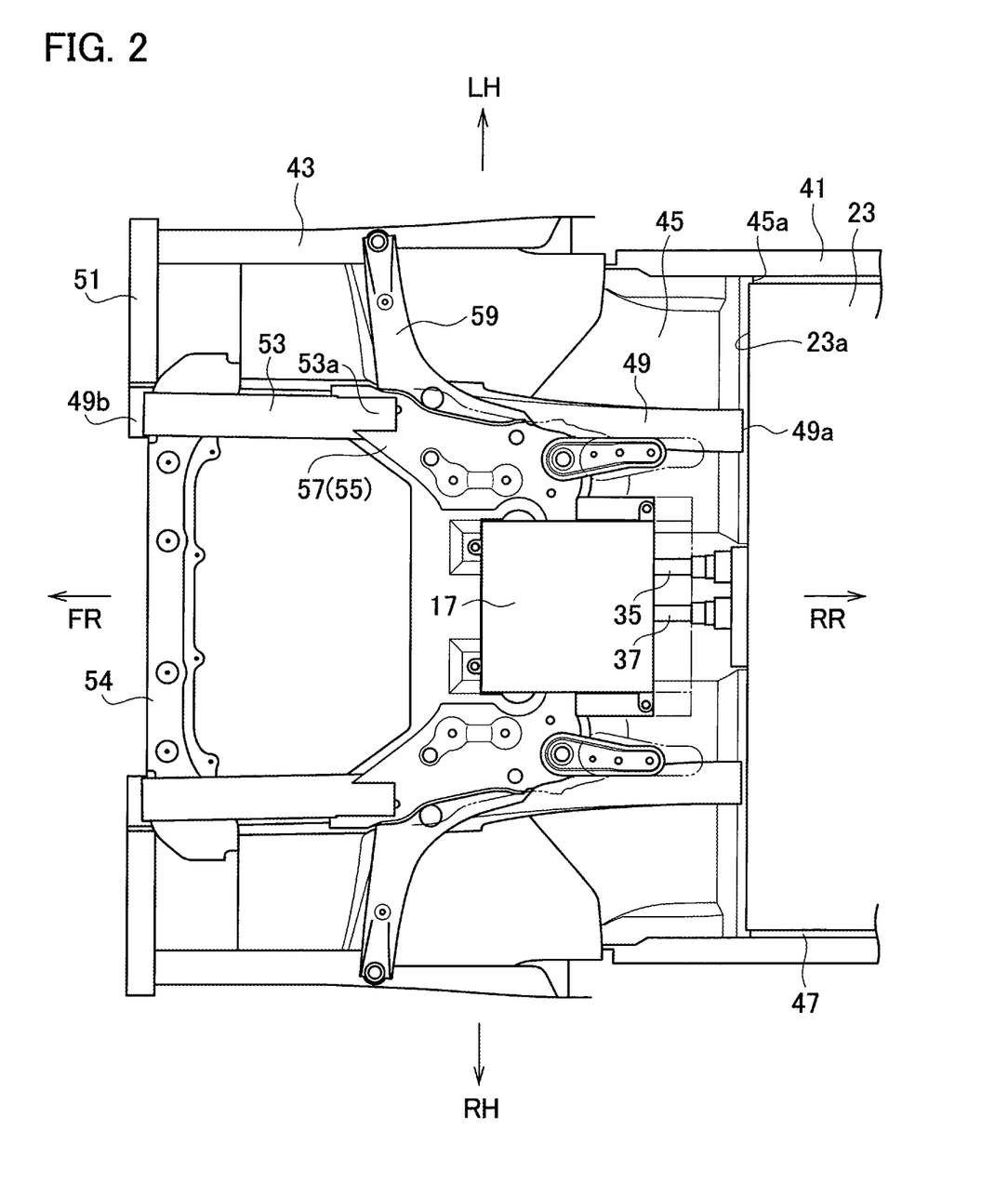
FIG. 2 is a bottom view of an area around a portion where a power reception coil unit according to a first embodiment is mounted.

As illustrated in FIG. 2, paired left and right side sills 41 extending in a front-rear direction are provided on sides of the battery 23. Paired left and right hood ridge supports 43 extending in the front-rear direction are provided in front of the side sills 41. A rear end 45a of a dash panel 45 is arranged adjacent to a front end 23a of the battery 23. Note that, as illustrated in FIGS. 1 and 2, a rear portion of the dash panel 45 is laid below a front portion of a floor panel 47 and is joined thereto. The dash panel 45 extends in an up-down direction and partitions a front compartment 1F and a vehicle cabin 1R from each other.

Moreover, as illustrated in FIG. 2, paired left and right front side members 49 extend in the front-rear direction. Rear ends 49a of the front side members 49 are arranged adjacent to the front end 23a of the battery 23 and front ends 49b of the front side members 49 are arranged at a front end of the vehicle. Paired left and right front cross members 51 are arranged at the front end of the vehicle. Connection members 53 extend in a front-rear direction. Front portions of the left and right connection members 53 are connected to each other by a front member 54 extending in the vehicle width direction. Rear portions 53a of the connection members 53 are joined to front leg portions 57 (see FIG. 4) of a suspension member 55. Lower arms 59 extending in the vehicle width direction are connected to side portions of the suspension member 55 and the hood ridge supports 43.

Figure 3:
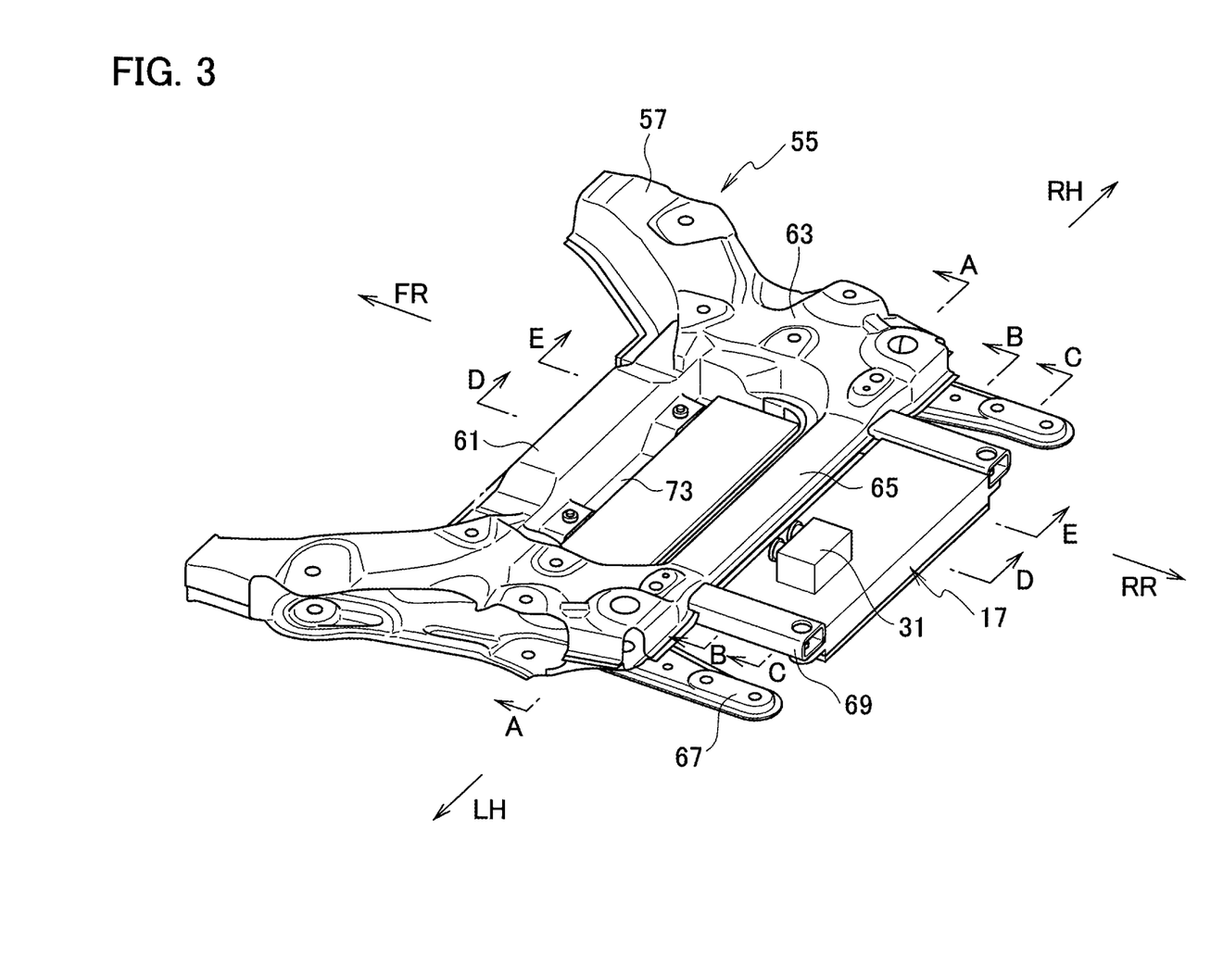
FIG. 3 is a perspective view illustrating a suspension member to which the power reception coil unit according to the first embodiment is attached.
Figure 4:
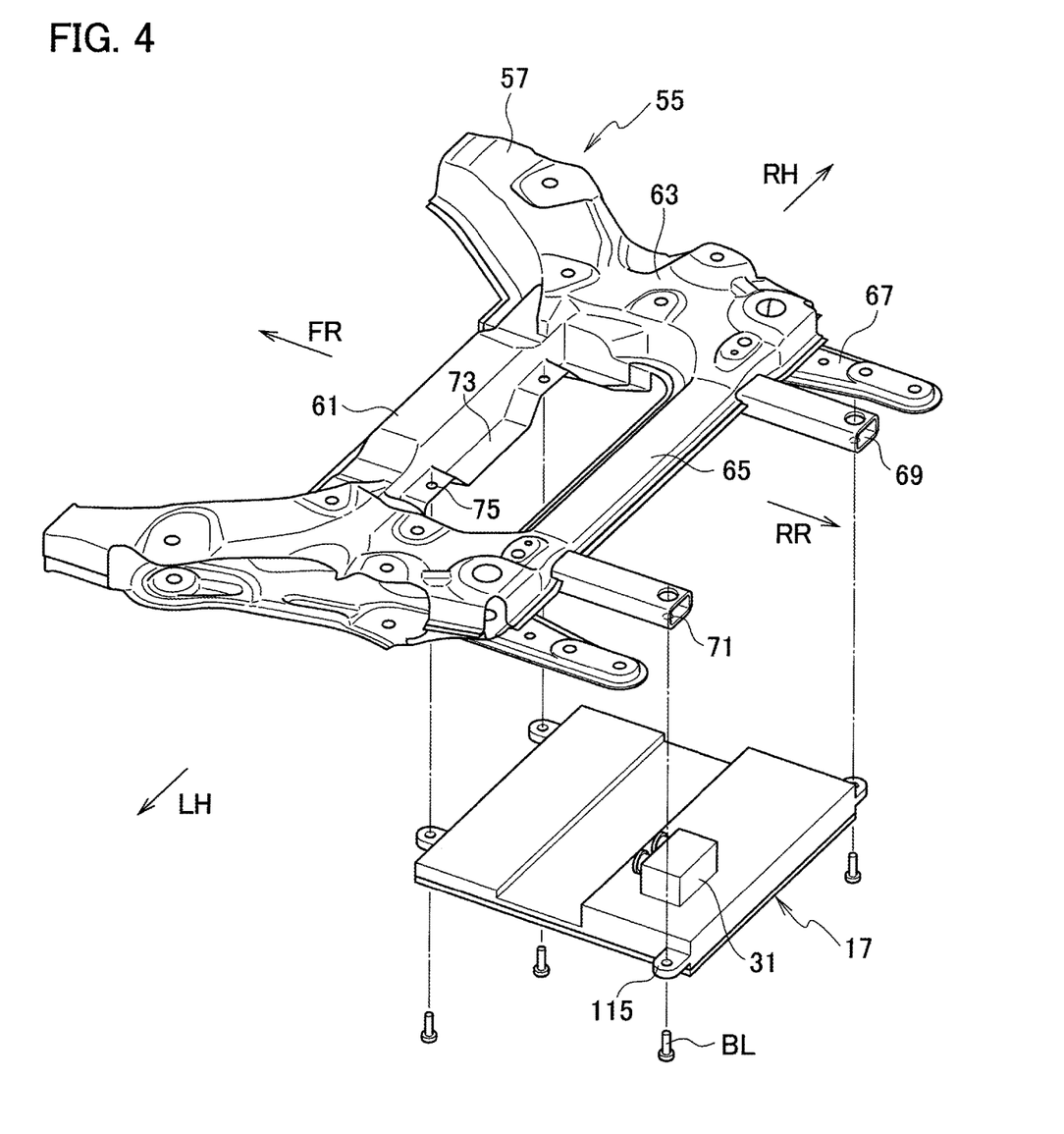
FIG. 4 is an exploded perspective view of FIG. 3.

As illustrated in FIGS. 3 and 4, the suspension member 55 is a member element serving as a frame member of a vehicle body and has high stiffness. The suspension member 55 is connected to the vehicle body in a normal state and is configured to be detachable from the vehicle body when predefined impact load is inputted into the suspension member 55. Specific description is given below.

As illustrated in FIG. 2, the suspension member 55 is formed integrally of the paired left and right front leg portions 57 extending forward, a front connection portion 61 connecting base portions of the paired left and right front leg portions 57 to each other in the vehicle width direction, main body side portions 63 extending rearward from rear ends of the front leg portions 57, and a rear connection portion 65 connecting rear ends of the main body side portions 63 to each other in the vehicle width direction. Moreover, rear leg portions 67 extend rearward from the rear ends of the main body side portions 63 and rearward extending portions 69 extend rearward from the rear ends of the main body side portions 63, inside the rear leg portions 67 in the vehicle width direction. The rear leg portions 67 are fastened to the front side members 49 via not-illustrated brackets. Moreover, the rearward extending portions 69 are formed in a square tube shape and bolt holes are formed in rear end portions. Weld nuts 71 are joined to the bolt holes. A rear flange 73 is formed in a rear portion of the front connection portion 61 to extend in the vehicle width direction and bolt holes 75 are formed in the rear flange 73.

As illustrated in FIGS. 3 to 5 and FIGS. 6A to 6E, the power reception coil unit 17 includes a cover 81, the power reception coil 83, a power transmission coil side magnetic member 85, a vehicle side magnetic member 87, a resonant capacitor 89, and a base plate 91.

Figure 5:
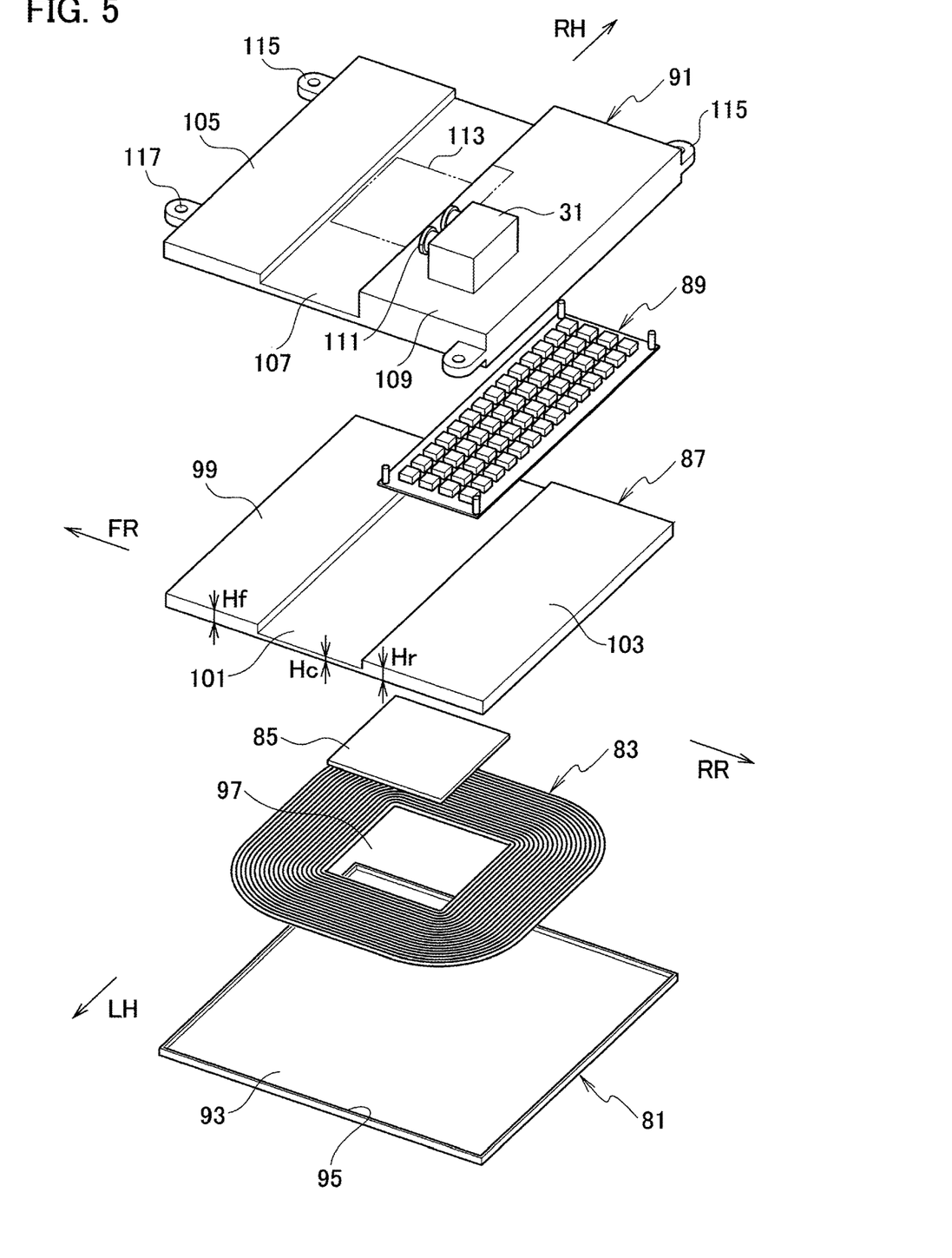
FIG. 5 is an exploded perspective view of the power reception coil unit according to the first embodiment.

The cover 81 is formed integrally of a flat surface portion 93 formed to have a rectangular shape in a plan view and a flange portion 95 bent and extending upward from a peripheral edge of the flat surface portion 93. The cover 81 is made of a non-magnetic material (for example, resin) which does not hinder electromagnetic induction.

The power reception coil 83 is a circular coil in which an electrically-conductive wire is wound in an annular shape. The power reception coil 83 is formed mainly of a secondary coil made of the electrically-conductive wire. A hollow portion 97 having a rectangular shape in the plan view is formed in a center portion of the power reception coil 83 in a radial direction thereof.

The power transmission coil side magnetic member 85 (magnetic member) is a magnetic material formed into a flat plate with a rectangular shape in the plan view. The power transmission coil side magnetic member 85 is housed inside the hollow portion 97 of the power reception coil 83. Moreover, the thickness of the power transmission coil side magnetic member 85 is set to be equivalent to the thickness of the power reception coil 83.

The vehicle side magnetic member 87 (magnetic member) is arranged on top of the power transmission coil side magnetic member 85 and the power reception coil 83. The vehicle side magnetic member 87 is a magnetic material formed into a flat plate with a rectangular shape in the plan view. The size of the vehicle side magnetic member 87 in a plane direction is set to be substantially the same as the flat surface portion 93 of the cover 81. The vehicle side magnetic member 87 is formed integrally of a front portion 99 arranged on the vehicle front side, a center portion 101 arranged behind the front portion 99, and a rear portion 103 arranged behind the center portion 101. A bottom surface of the vehicle side magnetic member 87 is flat while the height of an upper surface of the vehicle side magnetic member 87 varies depending on the portions. Specifically, the height Hc of the center portion 101 is set to be the lowest, the height Hf of the front portion 99 is set to be higher than the height Hc of the center portion 101, and the height Hr of the rear portion 103 is set to be higher than the height Hf of the front portion 99. In other words, the magnitude relationship of Hc<Hf<Hr is set. For example, ferrite or the like can be preferably used for the power transmission coil side magnetic member 85 and the vehicle side magnetic member 87.

Note that "power transmission coil side" in the power transmission coil side magnetic member 85 is the side closer to the "power transmission coil" than to the "vehicle 5" and is the lower side (road surface side) in the embodiment. Moreover, "vehicle side" in the vehicle side magnetic member 87 is the side closer to the "vehicle 5" than to the "power transmission coil" and is the upper side in the embodiment. As described above, the magnetic member includes the power transmission coil side magnetic member 85 and the vehicle side magnetic member 87.

The resonant capacitor 89 is connected to the power reception coil 83 in series and form a resonance circuit together with the power reception coil 83. The resonant capacitor 89 is an electronic part. The resonant capacitor 89 is placed on top of the rear portion of the vehicle side magnetic member 87.

The base plate 91 is formed integrally of a forward portion 105, a center portion 107, and a rearward portion 109, like the vehicle side magnetic member 87. The base plate 91 is made of a non-magnetic material (for example, aluminum) which does not hinder electromagnetic induction. The height of the center portion 107 is set to be the lowest, the height of the forward portion 105 is set to be higher than the height of the center portion 107, and the height of the rearward portion 109 is set to be higher than the height of the forward portion 105. The junction box 31 is arranged on an upper surface of the rearward portion 109.

A connector portion 111 is formed on a front surface of the junction box 31. The first harness 33 is connected to the connector portion 111. Moreover, a rectangular hollow portion corresponding region 113 illustrated by two-dot chain lines is set to extend over the center portion 107 and the rearward portion 109. This hollow portion corresponding region 113 is a portion facing the hollow portion 97 of the power reception coil 83. Support pieces 115 are provided to protrude from left and right sides of the rearward portion 109 and from a front side of the forward portion 105. Bolt holes 117 are formed in the respective support pieces 115.

With such a configuration, the contactless power feeding apparatus contactlessly supplies power from the power transmission coil to the power reception coil 83 by way of electromagnetic induction (magnetic coupling) between the power transmission coil and the power reception coil 83.

Moreover, the power reception coil 83, the resonant capacitor 89, the power transmission coil side magnetic member 85, and the vehicle side magnetic member 87 (magnetic member) are arranged in the power reception coil unit 17.

Next, a procedure of attaching the power reception coil unit 17 to the suspension member 55 is described.

As illustrated in FIG. 4, first, in a rear end portion of the power reception coil unit 17, the support pieces 115 in the rear portion of the power reception coil unit 17 are fastened to the rearward extending portions 69 of the suspension member 55. Specifically, bolts BL are inserted into the bolt holes 117 of the support pieces in the rear portion of the power reception coil unit 17 from below and are fastened to the weld nuts 71 joined to the rearward extending portions 69 of the suspension member 55.

Next, in the front end portion of the power reception coil unit 17, the support pieces 115 in the front portion of the power reception coil unit 17 are fastened to the rear flange 73 of the suspension member 55. Specifically, the bolts BL are inserted into the bolt holes 117 of the support pieces 115 in the front portion of the power reception coil unit 17 from below and are fastened to the bolt holes 75 formed in the rear flange 73 of the suspension member 55.

As described above, the power reception coil unit 17 is attached to the suspension member 55 which is the member element serving as the frame member of the vehicle body.

Figure 6A:
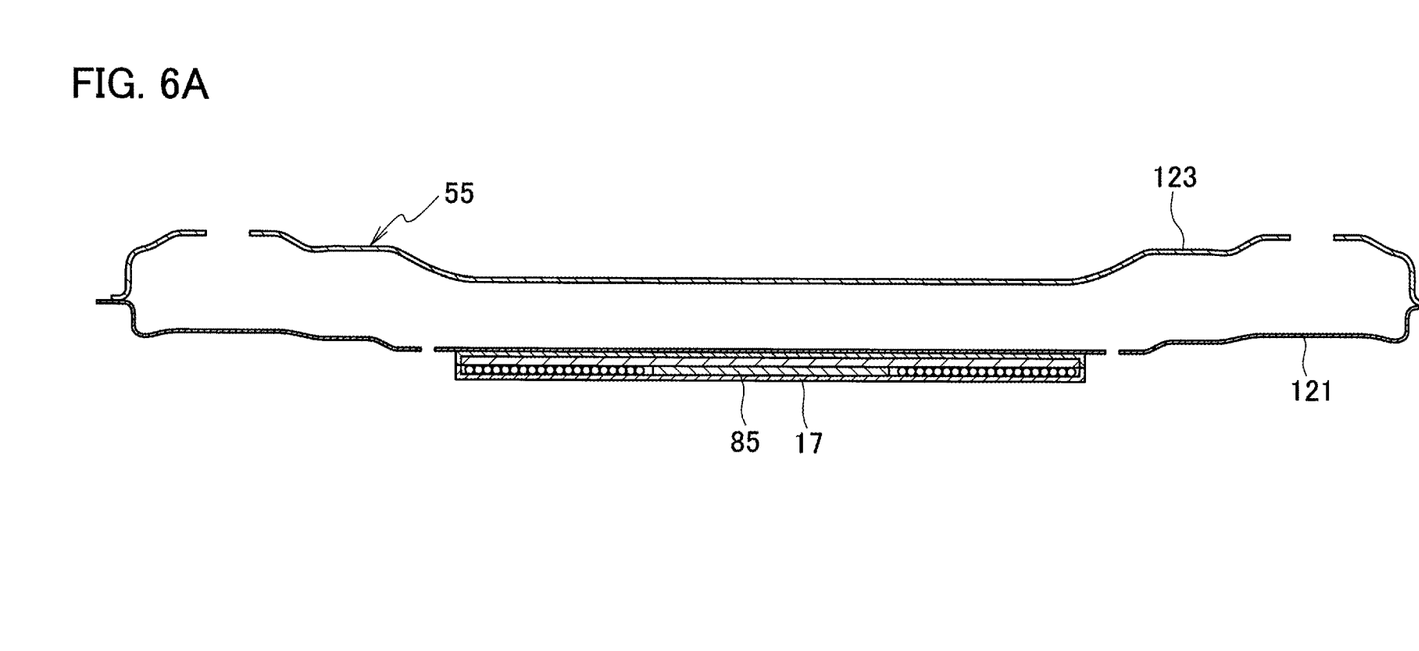
FIG. 6A is a cross-sectional view along the line A-A in FIG. 3.
Figure 6B:
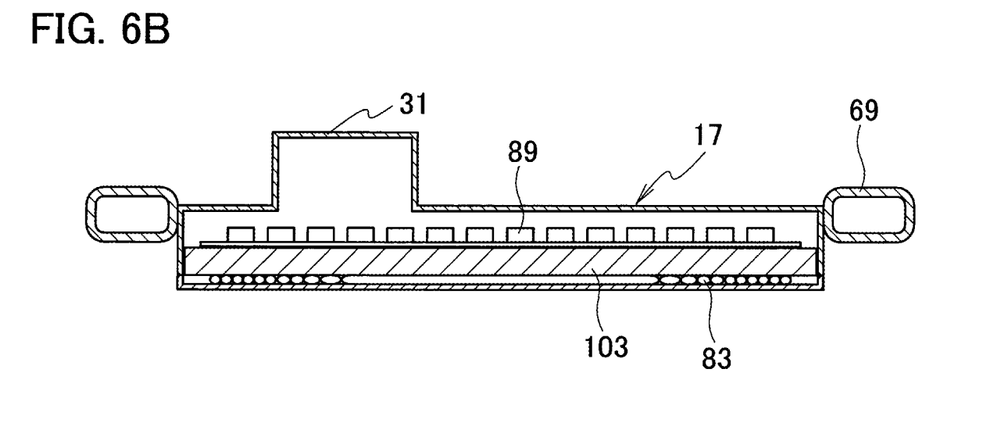
FIG. 6B is a cross-sectional view along the line B-B in FIG. 3.
Figure 6C:
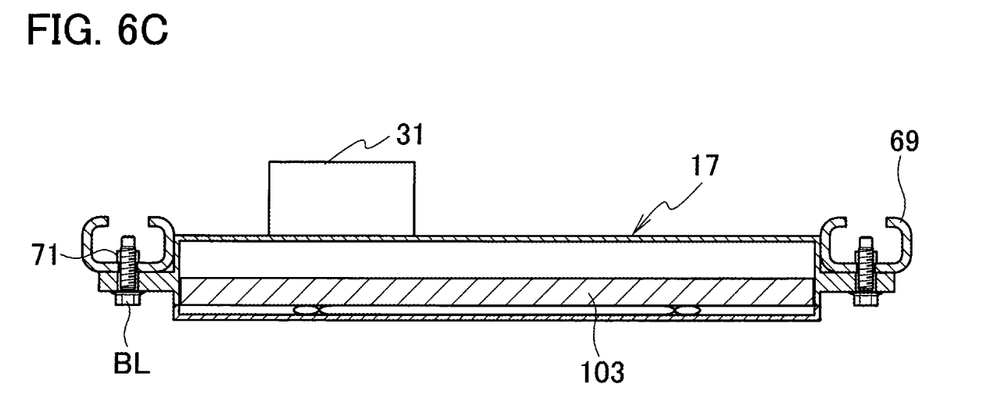
FIG. 6C is a cross-sectional view along the line C-C in FIG. 3.
Figure 6D:
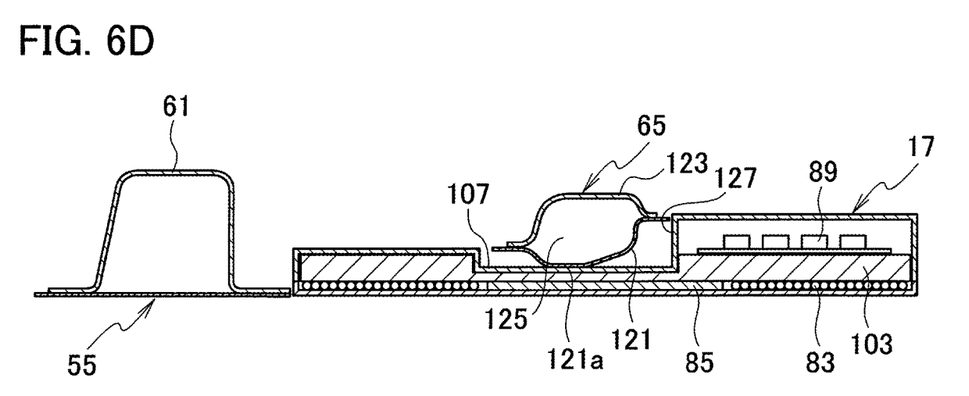
FIG. 6D is a cross-sectional view along the line D-D in FIG. 3.
Figure 6E:
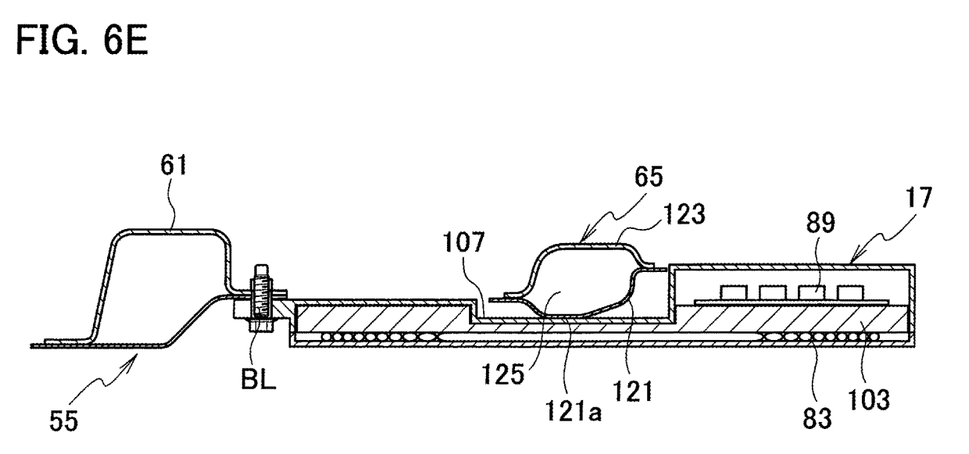
FIG. 6E is a cross-sectional view along the line E-E in FIG. 3.

As illustrated in FIGS. 6D and 6E, the rear connection portion 65 in the suspension member 55 is formed to have a closed cross-section structure with high stiffness. Specifically, the entire suspension member 55 including the rear connection portion 65 is formed by joining a lower member 121 arranged on the lower side and an upper member 123 arranged on the upper side. In the rear connection portion 65, front and rear end portions of the lower member 121 and front and rear end portions of the upper member 123 are joined to each other and a hollow portion 125 is thereby formed inside these members. A bottom surface 121a of the lower member 121 is in contact with the hollow portion corresponding region 113 set in the upper surface of the base plate 91 in the power reception coil unit 17. In the embodiment, specifically, the bottom surface 121a of the lower member 121 is in contact with the upper surface of the center portion 107 of the base plate 91. Moreover, a rear end of the lower member 121 is arranged close to a vertical wall 127 formed at a boundary between the center portion 107 and the rearward portion 109 of the base plate 91.

Moreover, as illustrated in FIGS. 6D and 6E, the resonant capacitor 89 is housed inside the rearward portion 109 of the base plate 91. The height at which the resonant capacitor 89 is arranged is equivalent to the height at which the rear connection portion 65 in the suspension member 55 is arranged. As described above, the electronic part including the resonant capacitor 89 is arranged behind and adjacent to the rear connection portion 65 (member element).

Operations and effects of the first embodiment are described below.

(1) The contactless power feeding apparatus 1 according to the first embodiment contactlessly supplies power to the vehicle 5 by way of magnetic coupling between the power transmission coil installed in the parking space and the power reception coil 83 mounted in the lower portion of the vehicle body of the vehicle 5. The power reception coil 83 is a circular coil in which the hollow portion 97 is formed in the center portion in the radial direction. The power reception coil 83, the resonant capacitor 89, and the set of the vehicle side magnetic member 87 and the power transmission coil side magnetic member 85 (magnetic member) are arranged in the power reception coil unit 17. The power reception coil unit 17 is attached to the suspension member 55 which is the member element serving as the frame member of the vehicle body. The hollow portion corresponding region 113 which is the portion of the power reception coil unit 17 corresponding to the hollow portion 97 of the power reception coil 83 is in contact with the suspension member 55 (member element).

The power reception coil unit 17 includes the power reception coil 83 and the hollow portion 97 is formed in the center portion of the power reception coil 83 in the radial direction. Accordingly, when the end portions of the power reception coil unit 17 are fixed to the vehicle body, the stiffness of the portion of the power reception coil unit 17 corresponding to the hollow portion 97 of the power reception coil 83 decreases. The portion of the power reception coil unit 17 corresponding to the hollow portion 97 of the power reception coil 83 is thus in contact with at least part of the suspension member 55 (member element) and the holding stiffness in the case where the power reception coil unit 17 is held on the vehicle body is thereby improved. Vibration and the like of the power reception coil unit 17 in traveling of the vehicle are thereby reduced.

(2) The suspension member 55 (member element) is connected to the vehicle body in the normal state and is configured to be detachable from the vehicle body when predefined impact load is inputted into the suspension member 55. Moreover, the power reception coil unit 17 is attached to the suspension member 55.

Accordingly, when the predefined impact load is inputted into the suspension member 55 in a rearward direction, the power reception coil unit 17 and the suspension member 55 move rearward integrally. Specifically, the power reception coil unit 17 and the suspension member 55 move rearward integrally without the relative distance between the power reception coil unit 17 and the suspension member 55 changing. Accordingly, the suspension member 55 protects the power reception coil unit 17 and deformation, damage, and the like of the power reception coil unit 17 are suppressed.

(3) The magnetic member includes the vehicle side magnetic member 87 arranged on the vehicle side and the power transmission coil side magnetic member 85 arranged on the power transmission coil side. The power transmission coil side magnetic member 85 is arranged in the hollow portion 97 of the power reception coil 83.

The power transmission coil side magnetic member 85 is arranged on the power transmission coil side of the vehicle side magnetic member 87. Specifically, since the power transmission coil side magnetic member 85 is arranged below the vehicle side magnetic member 87, the power transmission coil side magnetic member 85 is arranged close to the power transmission coil. This configuration has such an effect that the power transmission coil side magnetic member 85 can more easily receive the magnetic flux transmitted from the power transmission coil.

Moreover, the power transmission coil side magnetic member 85 is arranged in the hollow portion 97 of the power reception coil 83. Housing the power transmission coil side magnetic member 85 in the hollow portion 97 of the power reception coil 83 which would otherwise be a dead space can improve the space efficiency in arranging the parts in the power reception coil unit 17.

(4) The electronic part including the resonant capacitor 89 is arranged behind and adjacent to the suspension member 55 (member element).

The suspension member 55 is the member element serving as the frame member of the vehicle body. Accordingly, the suspension member 55 protects the electronic part including the resonant capacitor 89 and the damage and the like of the electric parts can be suppressed.

(5) The rectifier 19 is connected to the junction box 31 via the first harness 33. The first harness 33 is loosely routed with an extra length in the normal state (state of no abnormality such as collision).

This configuration has such an effect that, when the power reception coil unit 17 moves in vehicle collision, tension is less likely to act on the first harness 33 and the first harness 33 is thus less likely to break.

Second Embodiment

Next, the second embodiment is described. Portions with the same configurations as those in the aforementioned first embodiment are denoted by the same reference numerals and description thereof is omitted.

In the second embodiment, a power reception coil unit 217 is fastened to a center portion, in the vehicle width direction, of the rear connection portion 65 of the suspension member 55 with the bolts BL.

Figure 7:
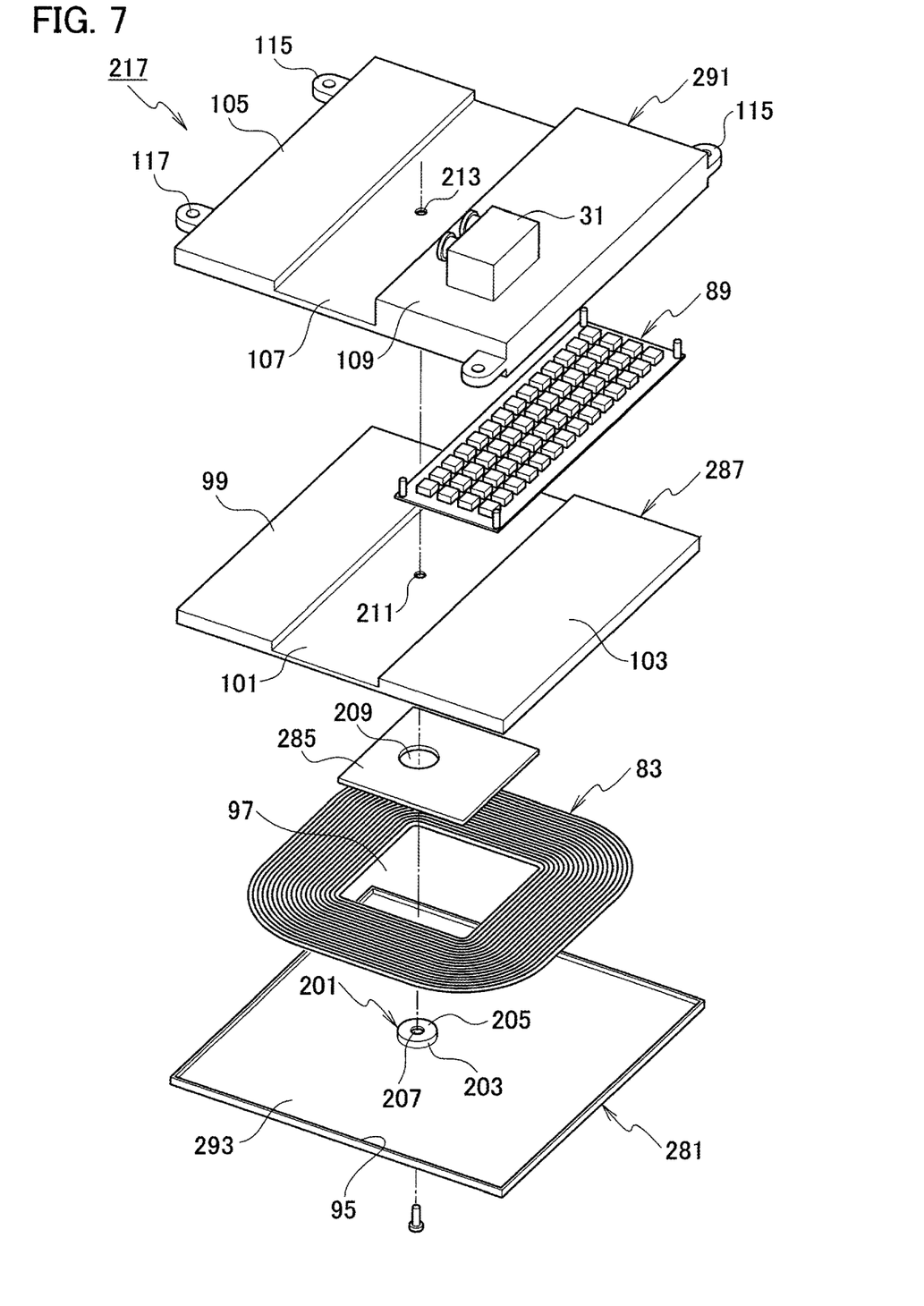
FIG. 7 is an exploded perspective view of a power reception coil unit according to a second embodiment.

As illustrated in FIG. 7, in the power reception coil unit 217 according to the second embodiment, a protruding portion 201 protruding upward is formed in a center portion of a flat surface portion 293 of a cover 281. This protruding portion 201 is formed integrally of a cylinder surface 203 protruding upward and circumferentially extending in a circle and an upper surface 205 closing an upper opening of the cylinder surface 203. A bolt hole 207 is formed at the center of the upper surface 205 in the radial direction. A circular hole 209 with a size equivalent to the outer diameter of the protruding portion 201 is formed in a power transmission coil side magnetic member 285. Bolt holes 211, 213 are formed also in a vehicle side magnetic member 287 and a base plate 291, respectively.

Figure 8A:
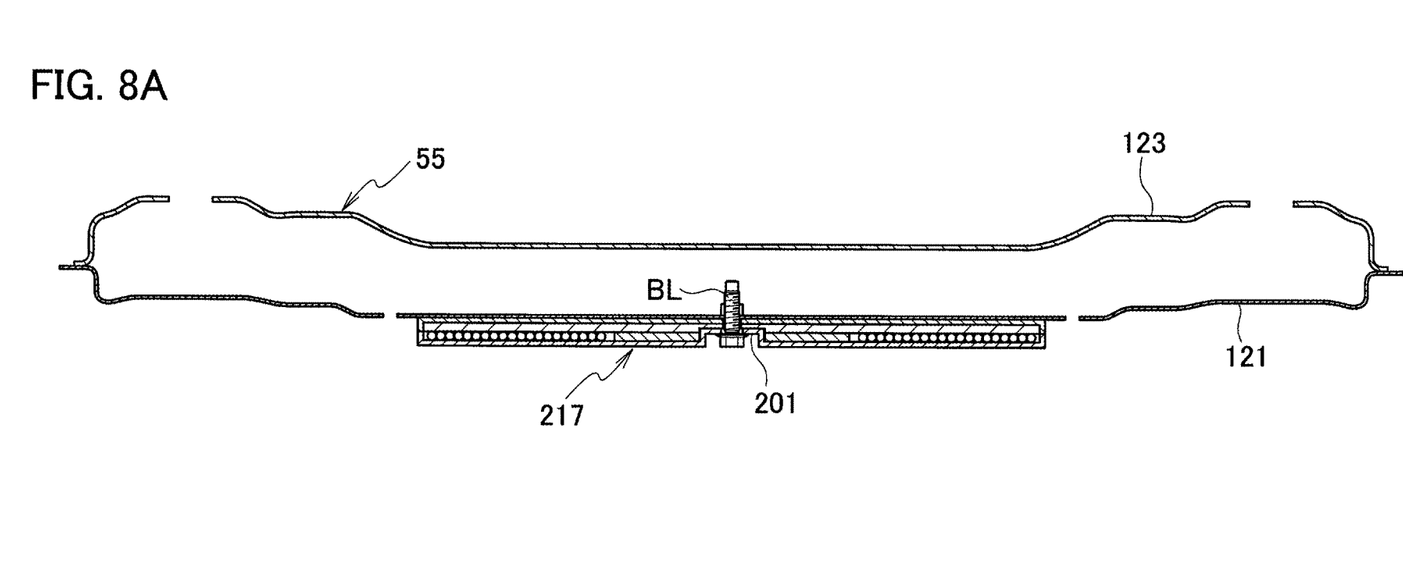
FIG. 8A is a cross-sectional view of the power reception coil unit according to the second embodiment and corresponds to FIG. 6A of the first embodiment.
Figure 8B:
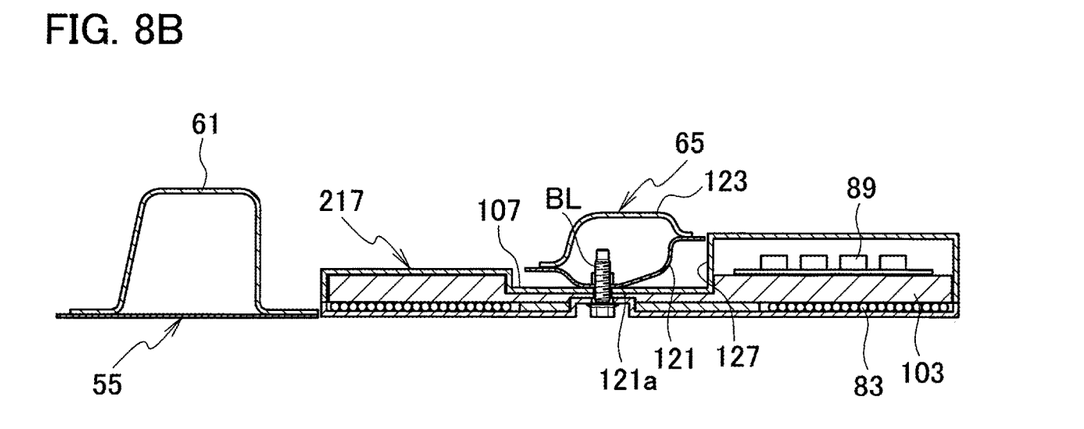
FIG. 8B is a cross-sectional view of the power reception coil unit according to the second embodiment and corresponds to FIG. 6D of the first embodiment.
Figure 9:
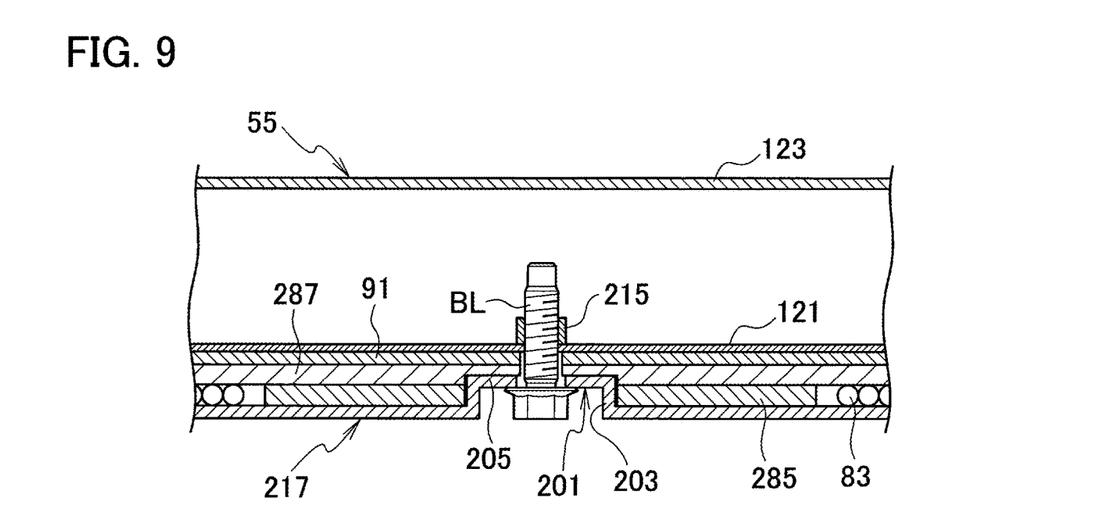
FIG. 9 is an enlarged cross-sectional view of a main portion of FIG. 8A.

Moreover, as illustrated in FIGS. 8A, 8B, and 9, a bolt hole and a weld nut 215 are provided in a center portion, in the vehicle width direction, of the lower member 121 in the rear connection portion 65 in the suspension member 55.

A procedure of fastening the power reception coil unit 217 to the rear connection portion 65 with the bolt is described below.

First, the bolt BL is inserted from below the power reception coil unit 217 and a distal end portion of the bolt BL is made to protrude from the base plate 291. Next, the distal end portion of the bolt BL is inserted into the bolt hole in the lower member 121 of the rear connection portion 65 and fastened to the weld nut 215.

Operations and effects of the second embodiment are described below.

(1) The power reception coil unit 217 is fastened to the center portion, in the vehicle width direction, of the rear connection portion 65 of the suspension member 55 with the bolt BL.

This configuration has such an effect that the stiffness at which the power reception coil unit 217 is held by the suspension member 55 is increased from that in the first embodiment and the vibration and the like of the power reception coil unit 17 in the traveling of the vehicle are further reduced.

Although the contents of the present invention have been described above according to the embodiments, the present invention is not limited to these descriptions and it is apparent to those skilled in the art that various modifications and improvements can be made.

For example, although the structure is such that the power transmission coil side magnetic member 85 and the vehicle side magnetic member 87 forming the magnetic member are separate bodies, the power transmission coil side magnetic member 85 and the vehicle side magnetic member 87 may be integrally formed.

REFERENCE SIGNS LIST 5 vehicle
7 contactless power reception device
17 power reception coil unit
55 suspension member (member element, vehicle body frame member)
83 power reception coil
85 power transmission coil side magnetic member (magnetic member)
87 vehicle side magnetic member 87 (magnetic member)
89 resonant capacitor
97 hollow portion
113 hollow portion corresponding region

The invention claimed is:

1. A vehicle-mounting structure for a contactless power reception device in which the contactless power reception device including a power reception coil configured to contactlessly receive power by way of magnetic coupling with a power transmission coil on a road surface side is mounted in a lower portion of a vehicle body of a vehicle, wherein
the power reception coil is a circular coil having a hollow portion formed in a center portion of the power reception coil in a radial direction,
the power reception coil, a resonant capacitor, and a magnetic member are arranged in a power reception coil unit forming the contactless power reception device,
the power reception coil unit is attached to a member element serving as a frame member of the vehicle body, and
a hollow portion corresponding region which is a portion of the power reception coil unit corresponding to the hollow portion of the power reception coil is in contact with the member element.

2. The vehicle-mounting structure for the contactless power reception device according to claim 1, wherein the member element is a suspension member connected to the vehicle body in a normal state and configured to be detachable from the vehicle body in response to input of a predefined impact load into the member element.

3. The vehicle-mounting structure for the contactless power reception device according to claim 1, wherein
the magnetic member comprises a vehicle side magnetic member arranged on a vehicle side and a power transmission coil side magnetic member arranged on the power transmission coil side, and
the power transmission coil side magnetic member is arranged in the hollow portion of the power reception coil.

4. The vehicle-mounting structure for the contactless power reception device according to claim 1, wherein an electronic part including the resonant capacitor is arranged behind and adjacent to the member element.

5. The vehicle-mounting structure for the contactless power reception device according to claim 1, wherein
upper surfaces of the power reception coil unit are formed to have heights from a bottom surface such that a center portion in a front-rear direction of the vehicle body is lower than a forward portion and a rearward portion in the front-rear direction,
the hollow portion corresponding region which is the portion of the power reception coil unit corresponding to the hollow portion of the power reception coil is located in the center portion, and
the center portion in which the hollow portion corresponding region of the power reception coil unit is located is in contact with the member element.

* * * * *